(12) United States Patent
Moody (10) Patent No.: US 7,004,682 B1
(45) Date of Patent: Feb. 28, 2006

(54) ARTICULATED PIPE JACK CLAMP

(76) Inventor: James Moody, P.O. Box 1236, Splendora, TX (US) 77372

(*) Notice: Subject to any disclaimer, the term of this patent is extended or adjusted under 35 U.S.C. 154(b) by 0 days.

(21) Appl. No.: 11/029,934

(22) Filed: Jan. 6, 2005

(51) Int. Cl.
  *F16L 3/00* (2006.01)
(52) U.S. Cl. .................... 405/184.4; 269/902
(58) Field of Classification Search ............ 405/184.4, 405/172, 154.1; 248/74.1; 269/902
  See application file for complete search history.

(56) References Cited

U.S. PATENT DOCUMENTS

| | | | |
|---|---|---|---|
| 2,108,077 A | | 2/1938 | Robinson |
| 2,371,831 A | * | 3/1945 | Leming ............... 269/902 |
| 2,455,024 A | * | 11/1948 | Schneider .............. 269/902 |
| 4,139,189 A | | 2/1979 | Weitrzyk |
| 4,195,828 A | | 4/1980 | Peterson |
| 4,268,189 A | * | 5/1981 | Good .................. 405/184.4 |
| 4,524,959 A | | 6/1985 | Kubo |
| 4,981,395 A | * | 1/1991 | Datin et al. ........... 405/184.4 |
| 5,042,958 A | * | 8/1991 | Stenersen ............. 405/184.4 |
| 5,135,209 A | | 8/1992 | Penny |
| 5,553,975 A | * | 9/1996 | Elkins ................ 405/184.4 |
| 5,863,035 A | | 1/1999 | Howell |
| 6,349,869 B1 | | 2/2002 | McBee |

* cited by examiner

*Primary Examiner*—Frederick L. Lagman
(74) *Attorney, Agent, or Firm*—Kenneth A. Roddy (57) ABSTRACT

Articulated pipe jack clamps include a pair of laterally opposed L-shaped legs hinged at an upper end to a central threaded collar, each having an elongate upper portion and a shorter inwardly turned bottom portion engageable with the underside of a wide V-shaped cradle of a pipe jack. A threaded stem engaged in the collar has a handle at its top end and an inverted V-shaped head connected at its bottom end by a ball-and-socket connection. The clamp is placed vertically downward over a work piece supported in the pipe jack cradle such that its V-shaped head is engaged on the top of the work piece, and the bottom portion of each leg is disposed beneath the sides of the cradle, then the head is screwed down to raise and engage the bottom portion of the legs on the underside of the cradle to clamp the work piece in the pipe jack.

14 Claims, 6 Drawing Sheets

ARTICULATED PIPE JACK CLAMP

BACKGROUND OF THE INVENTION

1. Field of the Invention

This invention relates generally to pipe clamping devices, more particularly, to an articulated pipe jack clamp having a pair of L-shaped leg members hingedly connected at an upper end to a central threaded collar in laterally opposed relation and having inwardly turned bottom ends engageable with a pipe jack cradle and an inverted V-shaped head at the end of a threaded stem that securely clamps a work piece or pipe into the pipe jack cradle.

2. Brief Description of the Prior Art

Welders, pipe fitters, and fabricators often use a pipe jack for welding or fabricating work pieces, particularly pipe of various diameters. The pipe jack has a wide V-shaped cradle with a threaded shaft received in a tubular base. The height of the V-shaped cradle is adjustably raised or lowered by turning a hand crank nut threadedly engaged on the shaft and rotatably supported on the base. The work piece or pipe is supported in the V-shaped cradle. Some methods of welding pipe involve placing the pipe on a jackstand and tack welding the pipe to the stand. After the fitting has been tacked to pipe, the pipe must be separated from the stand. Thereafter, tacks securing pipe in jackstand must be removed from the pipe. This is a cumbersome and time-consuming operation. In other methods, clamping devices are often used to secure the work piece or pipe to the pipe jack in order to prevent movement and prevent injuries.

There are several patents that disclose various devices capable of clamping or securing work pieces such as pipes. Some of these devices are fairly complex employing a number of moving parts, which could make them cost prohibitive. Also, some of these are of unitary construction and would require several devices to fit a wide range of pipe diameters. Others are not suitable for use with a pipe jack.

Robinson, U.S. Pat. No. 2,108,077 discloses a pipe joint welding clamp consisting of a V-shaped angle iron with two longitudinally spaced hinge bosses on one side, and two yokes, each of unitary construction having an arcuate top portion with a threaded opening therethrough, and integral opposed side portions extending downwardly therefrom. The bottom portion of one side is inwardly turned to engage the underside of the angle iron, and the bottom portion of the opposed side is rotatably mounted in the hinge boss on the side of the angle iron. This device is not particularly suited for use with a pipe jack, and does not have hinged side portions.

Wietrzyk, U.S. Pat. No. 4,139,189 discloses a clamp of unitary construction having an arcuate top portion with a threaded opening therethrough, and integral opposed side portions extending downwardly therefrom with inwardly turned bottom ends that engage slots on two opposing sides of a conventional V block. The device is used with a conventional V block and a pair of V block centers to support and center any rectangular stock upon the V block, while being machined.

Peterson, U.S. Pat. No. 4,195,828 discloses a boiler tube clamp comprising a U-shaped bracket having spaced free ends and a curved intermediate portion for nestingly receiving a tube end portion. An elongate pin is removably connected to the free ends for caging the pipe end portion therebetween. An adjustable threaded positioning member carried by an offset portion of the clamp moves an adjacent tube section into alignment with the tube section caged in the clamp.

Kubo, U.S. Pat. No. 4,524,959 discloses a holder for use in holding two pipes or pipe joints to be welded where one of the pipes or pipe joints is held by three pipe abutting members mounted in angularly spaced relation on a common holder with the position of the pipe abutting members being adjustable by a screw bar. The other pipe or pipe joint is held by means of three supporting screw bars adjustably mounted in the pipe abutting members.

Penny, U.S. Pat. No. 5,135,209 discloses a pipe clamp apparatus similar to a C-clamp having opposed V-shaped brackets for clamping a pipe therebetween.

Howell, U.S. Pat. No. 5,863,035 discloses a pipe jack clamp comprising a yoke of unitary construction having a top cross member with a threaded opening therethrough, a pair of side members fixed thereto extending at an obtuse outward angle downwardly therefrom terminating in an inwardly turned distal end extending at a right angle therefrom, and a threaded stem threadedly engaged in the threaded opening having a handle at the top end and an inverted V-shaped head rotatably mounted at the bottom distal end. Unlike the present invention, the side members are not articulated or pivoted, the pipe contact surfaces are not rubber coated, the head is not connected with a ball and socket connection, and because the side member are fixed, Howell requires that the clamp be slid over one end of the pipe and the V-shaped pipe jack support element.

McBee, U.S. Pat. No. 6,349,869 discloses a welding clamp which attaches along its base portion to the receiving plate of a conventional jack stand. An upright member extends from the base and is angled in a direction which extends toward a vertical axis defined by the jack stand. The support member provides a sleeve for receiving in an adjustable horizontal arm. One end of the arm defines a threaded aperture through which a bolt is positioned. The bolt is used to secure a segment of pipe within the pipe stand without a need for temporary tacking welds between the pipe and the jack stand.

The present invention is distinguished over the prior art in general, and these patents in particular by articulated pipe jack clamps that include a pair of L-shaped leg members hingedly connected at an upper end to a central threaded collar in laterally opposed relation, each having an elongate upper portion extending downwardly from the collar and terminating in a shorter inwardly turned bottom portion engageable with the underside of a wide V-shaped cradle of a pipe jack. A threaded stem threadedly engaged in the collar has a handle at its top end and an inverted V-shaped head, preferably rubber coated, connected at its bottom end by a ball-and-socket connection. In an alternate embodiment, the inward facing bottom portion of one leg is hinged to its upper portion and is fixed to the pipe jack cradle, such that entire clamp assembly pivots to one side of the pipe jack.

The work piece or pipe is preferably supported on rubber pads in the wide V-shaped cradle of the pipe jack, the clamp is placed vertically downward over the pipe such that the inverted V-shaped head is engaged on the top of the work piece or pipe, and the inwardly turned bottom portion of each leg is disposed beneath the outwardly diverging sides of the V-shaped cradle, then the V-shaped head is screwed down to raise and engage the bottom portion of the legs on the underside of the V-shaped cradle, thereby securely clamping the work piece or pipe to the pipe jack.

SUMMARY OF THE INVENTION

It is therefore an object of the present invention to provide an articulated pipe jack clamp having a pair of hinged laterally opposed L-shaped legs which can easily and quickly be installed vertically over a work piece or pipe supported in a pipe jack cradle to secure the work piece or pipe to the pipe jack stand.

It is another object of this invention to provide an articulated pipe jack clamp having a pair of hinged laterally opposed L-shaped legs with inward facing bottom ends engageable with the underside of a wide V-shaped cradle of a pipe jack.

Another object of this invention is to provide an articulated pipe jack clamp having a pair of hinged laterally opposed L-shaped legs engageable with the underside of a V-shaped cradle of a pipe jack, which can easily and quickly clamp a work piece or pipe into the pipe jack and does not require sliding the clamp over one end of the work piece or pipe and the V-shaped pipe jack support element.

Another object of this invention is to provide an articulated pipe jack clamp having a pair of hinged laterally opposed L-shaped legs having inward facing bottom ends which is secured to one side a pipe jack cradle such that entire clamp assembly pivots to one side of the pipe jack to allow a work piece or pipe to be vertically lowered onto and removed from the pipe jack and does not require sliding the clamp over one end of the work piece or pipe and the V-shaped pipe jack support element.

Another object of this invention is to provide an articulated pipe jack clamp a pair of hinged laterally opposed L-shaped legs with inward facing bottom ends engageable with the underside of a wide V-shaped rubber padded cradle of a pipe jack, wherein a work piece or pipe is secured between a rubber coated inverted V-shaped head clamp member and the rubber padded cradle of the pipe jack to prevent marring of the surface of the work piece or pipe and prevent relative sliding movement.

A further object of this invention is to provide an articulated pipe jack clamp having a pair of hinged laterally opposed L-shaped legs with inward facing bottom ends which is easily and quickly installed on a pipe jack and removed therefrom and is easy to operate.

A still further object of this invention is to provide a pipe jack clamp which is simple in construction, inexpensive to manufacture, and rugged and reliable in use.

Other objects of the invention will become apparent from time to time throughout the specification and claims as hereinafter related.

The above noted objects and other objects of the invention are accomplished by pipe jack clamps which include a pair of L-shaped leg members hingedly connected at an upper end to a central threaded collar in laterally opposed relation, each having an elongate upper portion extending downwardly from the collar and terminating in a shorter inwardly turned bottom portion engageable with the underside of a wide V-shaped cradle of a pipe jack. A threaded stem threadedly engaged in the collar has a handle at its top end and an inverted V-shaped head, preferably rubber coated, connected at its bottom end by a ball-and-socket connection. In an alternate embodiment, the inward facing bottom portion of one leg is hinged to its upper portion and is fixed to the pipe jack cradle, such that entire clamp assembly pivots to one side of the pipe jack.

The work piece or pipe is preferably supported on rubber pads in a wide V-shaped cradle of the pipe jack, the clamp is placed vertically downward over the work piece or pipe such that the inverted V-shaped head is engaged on the top side of the work piece or pipe, and the inwardly turned bottom portion of each leg is disposed beneath the outwardly diverging sides of the V-shaped cradle, then the V-shaped head is screwed down to raise and engage the bottom portion of the legs on the underside of the V-shaped cradle, thereby securing the work piece or pipe to the pipe jack.

DESCRIPTION OF THE PREFERRED EMBODIMENTS

Figure 1:
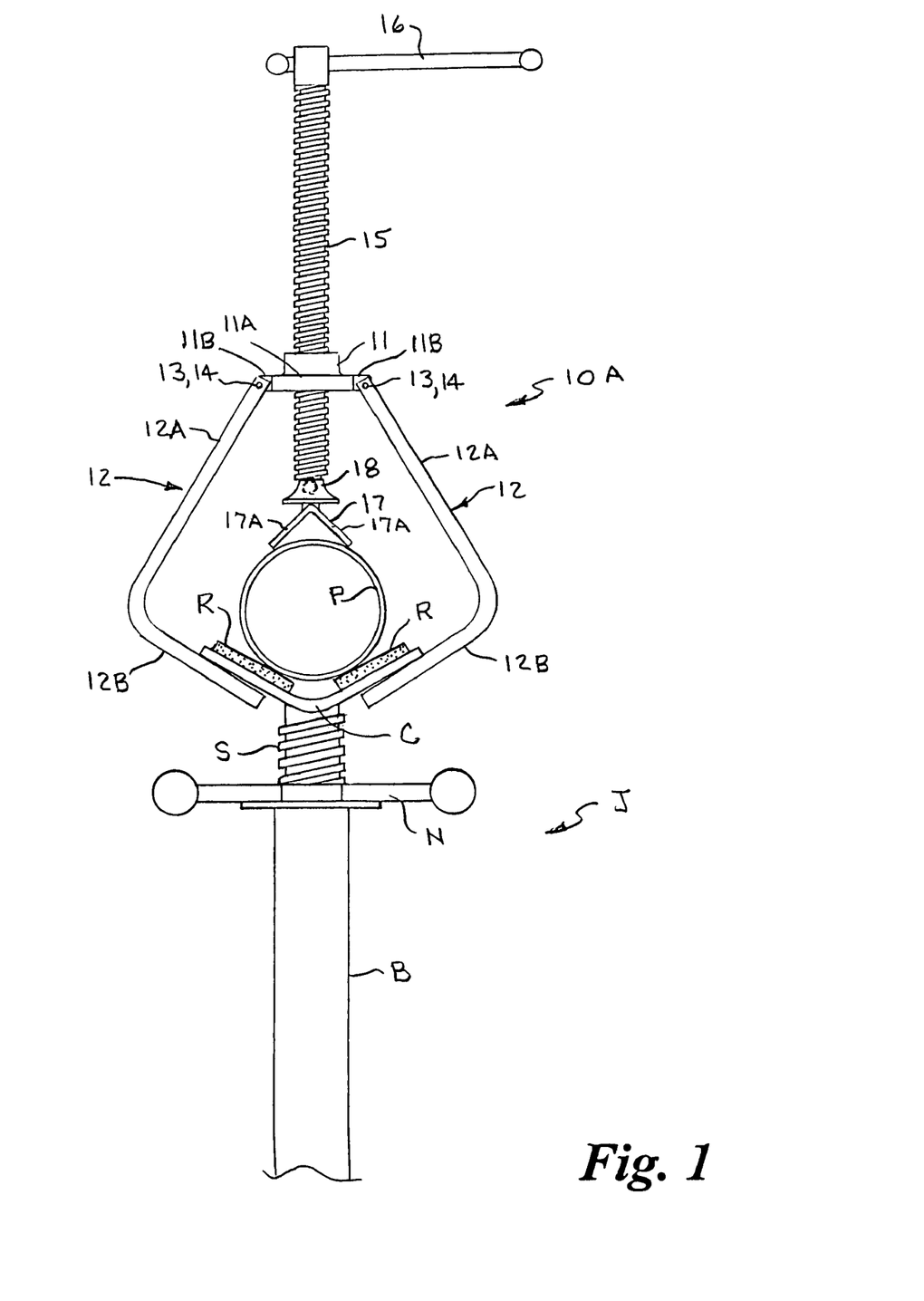
FIG. 1 is a front elevation view of a first embodiment of the pipe jack clamp in accordance with the present invention, shown clamped onto the cradle of a pipe jack with a pipe held in position between the inverted V-shaped head and pipe jack cradle.
Figure 2:
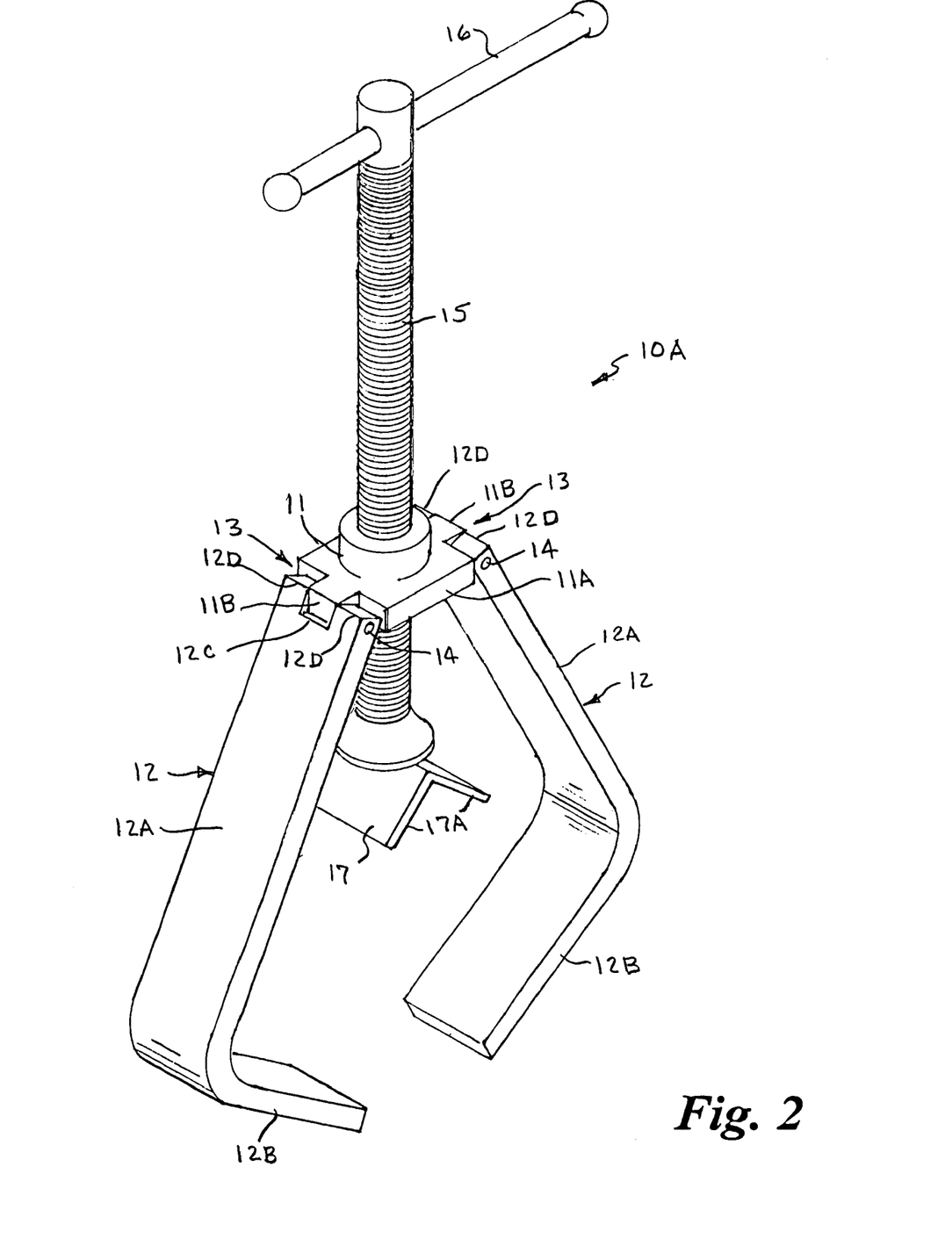
FIG. 2 is a perspective view of the pipe jack clamp of FIG. 1.

Referring now to FIG. 1 of the drawings, the pipe jack clamps in accordance with the present invention are adapted to be engaged on, or secured to, a pipe jack J which supports the work piece, such as a pipe P, to prevent movement during grinding, welding flanges or elbows, rolling offsets, and other operations. It should be understood that the present pipe jack clamps may be used for securing round pipe, angles, square and rectangular tubing. However in the following discussion, for purposes of example, the object to be secured is shown as a pipe and referred to as the work piece or pipe.

The pipe jack J is substantially of conventional construction having a wide V-shaped cradle C at its top end with a threaded shaft S received in a tubular base B (conventional and therefore not shown in its entirety). The work piece or pipe P is supported in the V-shaped cradle C. The height of the V-shaped cradle C is adjustably raised or lowered by turning a hand crank nut N threadedly engaged with the shaft S and rotatably supported on the base B. In the present invention, preferably, a rubber pad R, or other elastomeric cushioning means, is secured to the upper facing surfaces of the V-shaped cradle C to prevent marring of the surface of the pipe and prevent relative sliding movement.

Figures 3, 4:
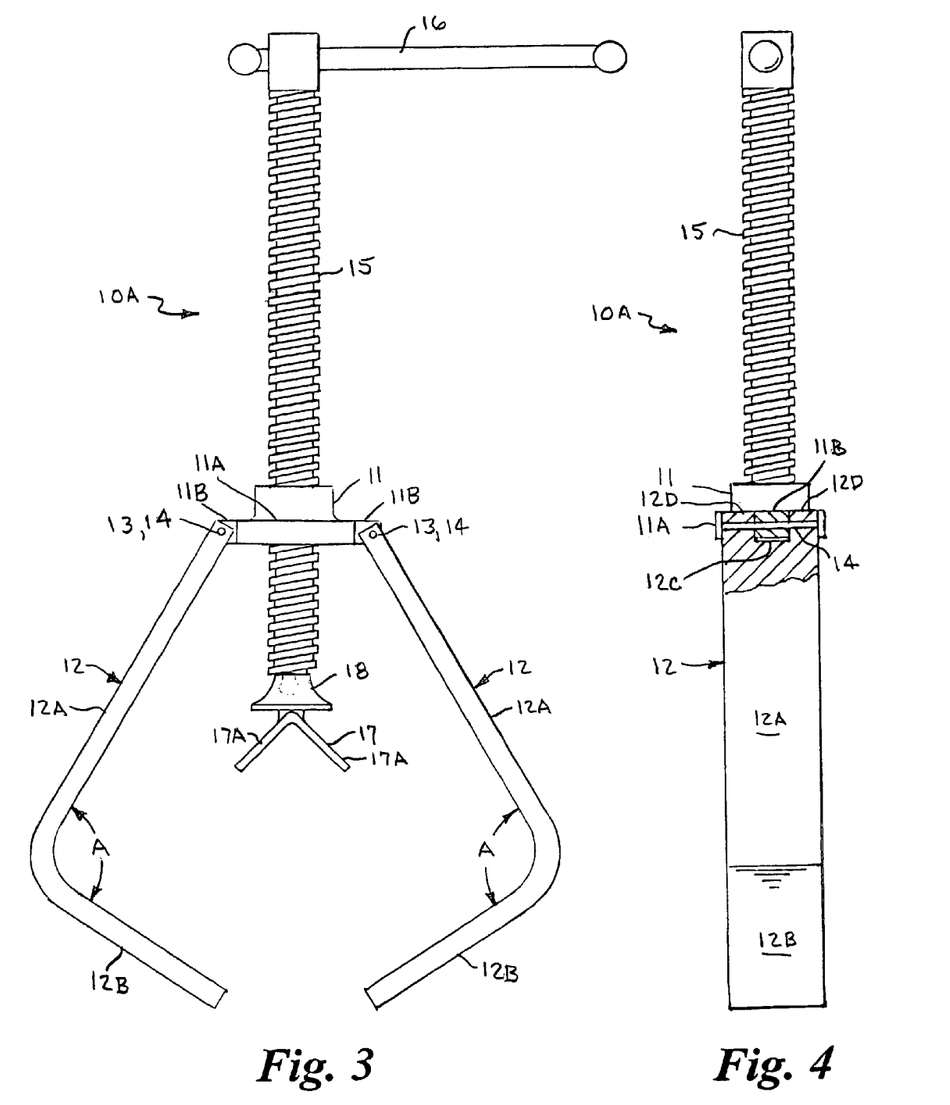
FIG. 3 is a front elevation view of the pipe jack clamp of FIG. 1.
FIG. 4 is a side elevation view of the pipe jack clamp of FIG. 1.

A first embodiment of the articulated pipe jack clamp 10A is shown in FIGS. 1 through 4, which is suitable for use in engaging pipe diameters ranging from 1½" to 6" in diameter. The pipe jack clamp 10A includes a central internally threaded collar member 11 and a pair of laterally opposed L-shaped leg members 12. Each leg 12 has an elongate upper portion 12A terminating in a short inwardly turned bottom portion 12B. In a preferred embodiment, the inwardly turned bottom portion 12B of each leg is disposed at an angle "A" relative to the elongate upper portion 12A (FIG. 3). The upper ends of the elongate portions 12A of the legs 12 are pivotally connected to the collar 11 by hinge connections 13 in laterally opposed relation so as to swing toward and away from one another. The legs 12 may be formed of 1½" wide×⅜" thick flat bar stock.

A preferred hinge connection 13 is shown in FIG. 4. The collar 11 has rectangular bottom portion 11A with a pair of short generally rectangular tongue portions 11B extending outwardly therefrom in laterally opposed relation. The top end of the each leg 12 has a generally rectangular slot 12C at its center with adjacent side portions 12D at opposed sides thereof. The tongue portion 11B of the collar 1 is slidably received in the slot 12C, and a pivot pin 14 is installed transversely through holes in the tongue portion 11B of the collar 11 and side portions 12D of the leg 12 to form the hinge connection 13.

An externally threaded stem 15 is threadedly engaged in the collar 11 and has a handle 16 at its top end and an inverted V-shaped head 17 is connected at its bottom end by a swivel connection, such as a ball-and-socket connection 18. The inverted V-shaped head 17 has lateral side portions 17A that diverge angularly downward and outward at an angle in opposed relation to the angle of the V-shaped cradle C of the pipe jack J. In the preferred embodiment, the inverted V-shaped head 17 is provided with a rubber coating, or other elastomeric coating, to prevent marring of the surface of the pipe and prevent relative sliding movement.

In operation, the pipe P to be welded is supported in the V-shaped cradle C of the pipe jack J. With the inverted V-shaped head 17 of the pipe clamp 10A in a retracted position, the legs 12 are swung open (away from one another) and the pipe jack clamp is placed vertically downward over the pipe such that the inverted V-shaped head is engaged on the top side of the pipe P, and the legs are released. In this position, the pipe P is positioned on the padded surface R between the apex of the V-shaped cradle C of the pipe jack J and the inverted V-shaped head 17 of the pipe clamp, and the inwardly turned bottom portion 12B of each leg is disposed beneath the outwardly diverging sides of the V-shaped cradle of the pipe jack.

Then the handle 16 at the top end of the stem 15 is rotated to screw the inverted V-shaped head 17 down, which raises the inwardly turned bottom portion 12B of the legs 12 to engage the underside of the outwardly diverging sides of the V-shaped cradle C of the pipe jack J, thereby securing the pipe to the pipe jack. The rubber pads R on the upper facing surfaces of the V-shaped cradle C and the rubber coating of the inverted V-shaped head 17 prevent marring of the surface of the pipe and prevent relative sliding movement. The rubber pads and rubber coating also prevent contamination by carbon steel clamps when used in supporting stainless steel pipe. The top surface of the inwardly turned bottom portion 12B of the legs 12 may be knurled, textured, coated, or otherwise provided with a non-slip surface to prevent slipping relative to the underside of the cradle of the pipe jack.

In a preferred embodiment which is suitable for use in engaging pipe diameters ranging from 1½" to 4" in diameter, the elongate upper portion 12A of each leg 12 extends approximately 6⅜" from the pivot point and the short inwardly turned bottom portion 13B extends inwardly a distance approximately 2⅜" from the inward facing surface of the upper portion. The inwardly turned bottom portion 12B of each leg is disposed at an angle "A" of from about 80° to about 100° relative its said elongate upper portion, preferably at angle of about 90° relative to the elongate upper portion.

In a preferred embodiment which is suitable for use in engaging pipe diameters ranging from 1½" to 6" in diameter, the elongate upper portion 12A of each leg 12 extends approximately 8¾" from the pivot point and the short inwardly turned bottom portion 13B extends inwardly a distance approximately 3¾" from the inward facing surface of the upper portion.

Alternatively, the inwardly turned bottom portion 12B of one leg 12 may be tack welded to the underside of the cradle C of the pipe jack such that when the clamp 10A is pivoted to an upright position, the centerline of the stem 15 and the apex of the inverted V-shaped head 17 is vertically aligned with the apex of the V-shaped cradle of the pipe jack.

Figure 5:
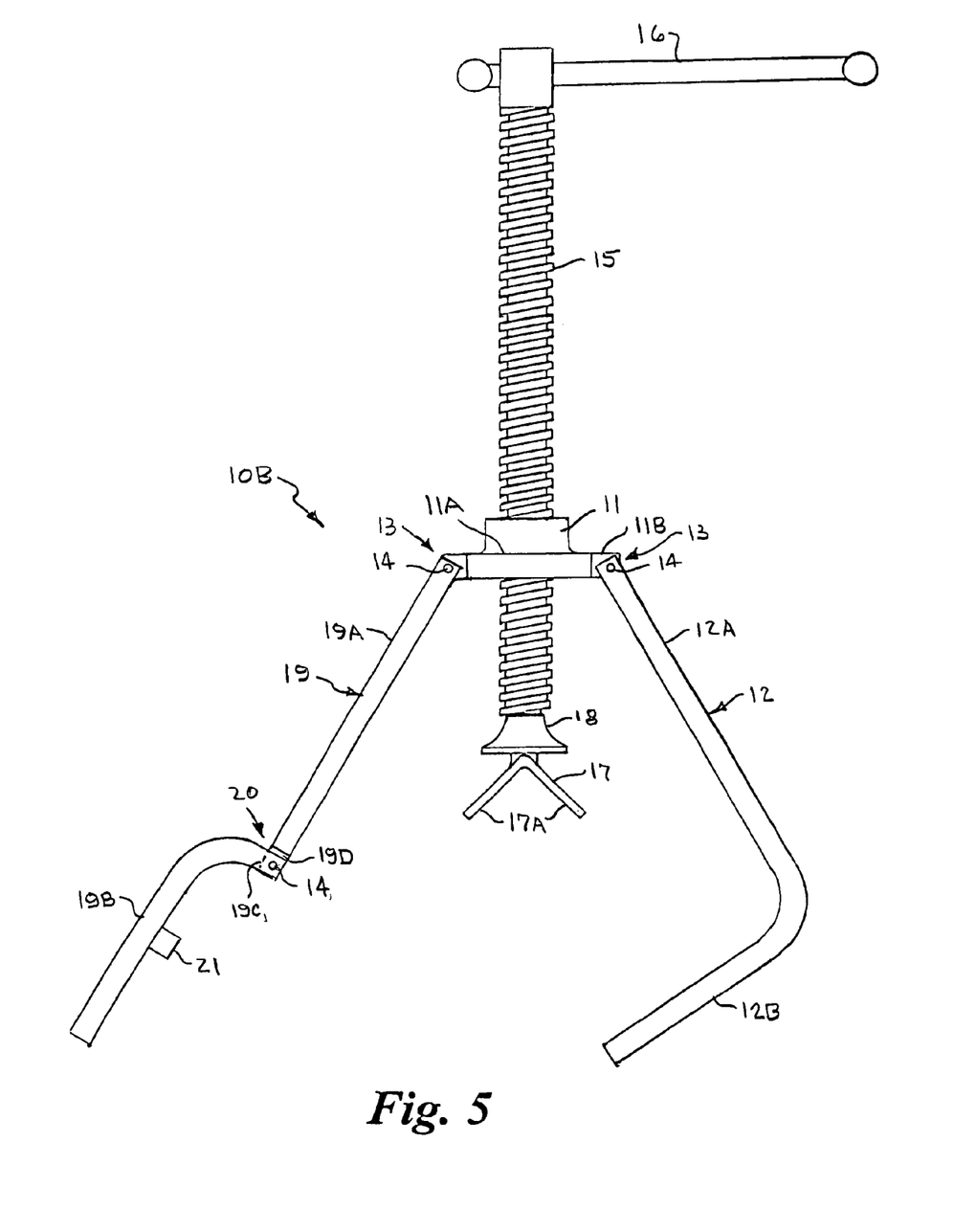
FIG. 5 is a front elevation view of a second embodiment of the pipe jack clamp in accordance with the present invention, wherein one leg is segmented at its lower end.
Figure 6:
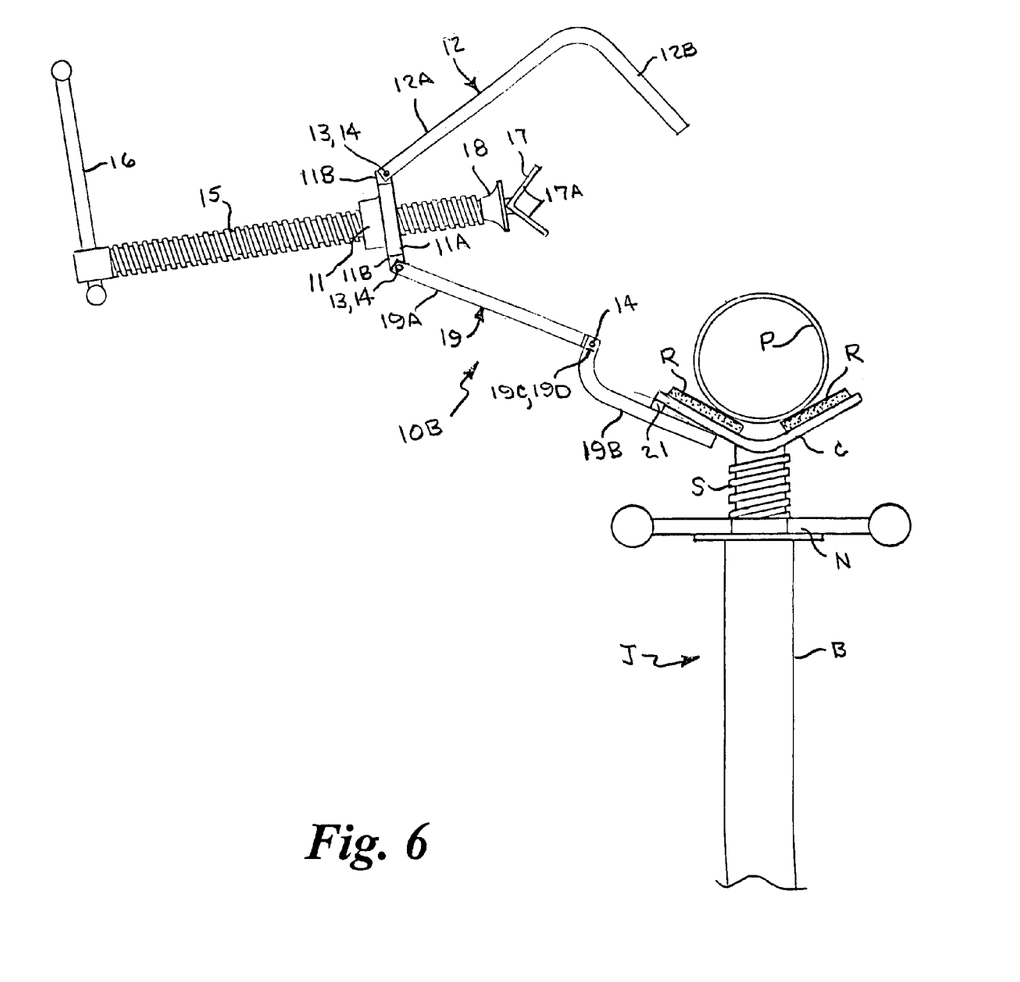
FIG. 6 is a front elevation view of the embodiment of FIG. 5, shown pivoted relative to the pipe jack cradle.

A second embodiment of the pipe jack clamp 10B is shown in FIGS. 5 and 6, which is suitable for use in engaging pipe diameters in the sizes described above and has one leg 19 adapted to be fixed to the underside of the V-shaped cradle C of the pipe jack J such as by welding. The structural features and elements of the second embodiment of the pipe jack clamp 10B that are the same as the previously described first embodiment are assigned the same numerals of reference, but their detailed description will not be repeated again here to avoid repetition.

In this embodiment, the pipe jack clamp 10B has one leg 12 with an elongate upper portion 12A and integral inwardly turned bottom portion 12B, as previously described, and a segmented second leg 19 having an elongate upper portion segment 19A and a generally L-shaped inwardly turned bottom portion segment 19B that is pivotally connected to the elongate upper portion segment by a third hinge connection 20. The upper ends of the elongate portion 12A of the leg 12 and elongate upper portion segment 19A of the segmented leg 19 are pivotally connected to the collar 11 by hinge connections 13 in laterally opposed relation so as to swing toward and away from one another, as described above.

The top end of the inwardly turned bottom portion segment 19B of the leg 19 has a generally rectangular slot 19C at its center, and the bottom portion of the elongate upper portion segment 19A is provided with a protruding tongue portion 19D that is slidably received in the slot 19C, and pinned therein by a pivot pin 14 installed transversely through holes in the tongue portion 19D and side portions of the top end of the bottom portion segment 19B to form the third hinge connection 20.

A small rectangular spacer bar 21 formed of square bar stock may be secured transversely to the top surface of the inwardly turned bottom portion segment 19B of the leg 19 to facilitate spacing and welding the bottom portion segment to the underside of one of the outwardly diverging sides of the V-shaped cradle C of the pipe jack J.

As shown in FIG. 6, the pipe jack clamp 10B is pivoted over to one side of the pipe jack cradle C about the lower hinge connection 13 when installing or removing the pipe from the cradle. The inwardly turned bottom portion segment 19B of the leg 19 is welded at a laterally spaced location relative to the underside of the cradle C of the pipe jack such that when the clamp is pivoted to an upright position, the centerline of the stem 15 and the apex of the inverted V-shaped head 17 is vertically aligned with the apex of the V-shaped cradle of the pipe jack.

Figure 7:
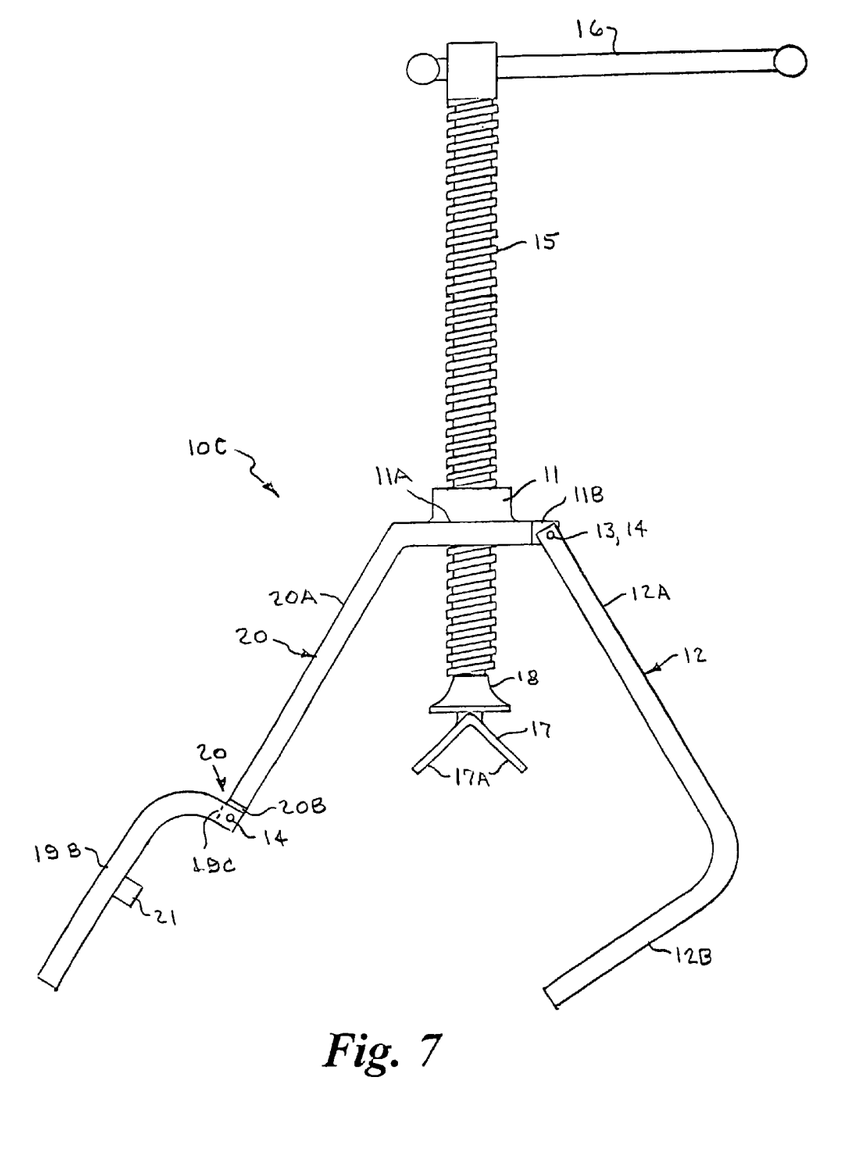
FIG. 7 is a front elevation view of a third embodiment of the pipe jack clamp in accordance with the present invention, wherein the segmented leg is fixed at an upper end to the collar member of the clamp.

A third embodiment of the pipe jack clamp 10C is shown in FIG. 7, which is also suitable for use in engaging pipe diameters in the sizes described above, and has one segmented leg 20 adapted to be fixed to the underside of the V-shaped cradle C of the pipe jack J. The structural features and elements of the third embodiment of the pipe jack clamp 10C that are the same as the previously described embodiments are assigned the same numerals of reference, but their detailed description will not be repeated again here to avoid repetition.

In this embodiment, the upper end of the elongate portion 12A of one leg 12 is pivotally connected to the collar 11 by a hinge connection 13, as described above, and the upper end of the elongate upper portion 20A of the laterally opposed segmented leg 20 is fixed to the bottom portion 11B of the collar 11, or integrally formed therewith to extend angularly outward and downward therefrom. The bottom end of the segmented leg 20 has a protruding tongue portion 20B, and an inwardly turned bottom portion segment 19B is pivotally connected thereto by a pivot pin 14 to form a hinge connection 21, as previously described. The inwardly turned bottom portion segment 19B of the leg 20 is welded to the underside of one of the outwardly diverging sides of the V-shaped cradle C of the pipe jack J, and may be provided with the previously described spacer bar 21 to facilitate spacing and welding. As with the previously described embodiment, the pipe jack clamp 10C is pivoted over to one side of the pipe jack cradle C about the lower hinge connection 21 when installing or removing the pipe from the cradle.

Unlike most unitary pipe jack clamps of the prior art, the present articulated pipe jack clamps easily and quickly clamp a pipe into the pipe jack and do not require sliding the clamp over one end of the pipe and the V-shaped pipe supporting cradle.

While this invention has been described fully and completely with special emphasis upon preferred embodiments, it should be understood that within the scope of the appended claims the invention may be practiced otherwise than as specifically described herein.

What is claimed is:

1. An articulated pipe jack clamp for securing a work piece in a V-shaped cradle of a pipe jack, comprising:
   a central internally threaded collar member;
   an externally threaded stem threadedly engaged in said collar and having a handle at a top end and an inverted V-shaped head connected at its bottom end by a swivel connection;
   a pair of generally L-shaped leg members, each having an elongate upper portion hingedly connected at an upper end to said threaded collar in laterally opposed relation and extending downwardly therefrom and terminating in a shorter inwardly turned bottom portion disposed at an angle relative said elongate upper portion, said leg members being pivotal toward and away from one another in laterally opposed relation; wherein
   said clamp is placed vertically downward onto a work piece supported in the cradle such that said head is engaged on the top of the work piece, and said inwardly turned bottom portion of each leg is disposed beneath the outwardly diverging sides of the V-shaped cradle, then the stem is rotated to screw the head down to raise and engage said leg bottom portions on the underside of the V-shaped cradle, thereby securely clamping the work piece to the pipe jack.

2. The articulated pipe jack clamp according to claim 1, wherein
   said inverted V-shaped head has an elastomeric coating to prevent marring of the surface of the work piece.

3. The articulated pipe jack clamp according to claim 1, wherein
   said inverted V-shaped head is connected to the bottom end of said stem by a ball-and-socket connection.

4. The articulated pipe jack clamp according to claim 1, wherein
   said collar member has a pair of short generally rectangular tongue portions extending outwardly therefrom in laterally opposed relation, and each said leg upper end has a generally rectangular slot at its center with adjacent side portions at opposed sides thereof; wherein
   each said collar tongue portion is slidably received in said slot of a respective said leg member and pivotally connected thereto be a pivot pin extending transversely through holes in said tongue portion and said side portions.

5. The articulated pipe jack clamp according to claim 1, wherein
   said inwardly turned bottom portion of each said leg is provided with a non-slip top surface to prevent slipping relative to the underside of the cradle of the pipe jack.

6. The articulated pipe jack clamp according to claim 1, wherein
   said inwardly turned bottom portion of each said leg is disposed at an angle of from about 80° to about 100° relative its said elongate upper portion.

7. An articulated pipe jack clamp for securing a work piece in a V-shaped cradle of a pipe jack, comprising:
   a central internally threaded collar member;
   an externally threaded stem threadedly engaged in said collar and having a handle at a top end and an inverted V-shaped head connected at its bottom end by a swivel connection;
   a first generally L-shaped segmented leg member having an elongate upper portion segment hingedly connected at an upper end to one side of said collar, and a shorter inwardly turned bottom portion segment hingedly connected at the lower end thereof adapted to be secured to the underside of one outwardly diverging side of the V-shaped cradle;
   a second generally L-shaped leg member having an elongate upper portion hingedly connected at an upper end to said threaded collar in laterally opposed relation to said first leg and a shorter inwardly turned bottom portion disposed at an angle relative to its said elongate upper portion; wherein
   when said shorter inwardly turned bottom portion segment of said first leg is secured to the underside of one outwardly diverging side of the V-shaped cradle, said clamp is pivoted over to one side of the cradle in an open position when installing or removing the pipe from the cradle, and is pivoted to an upright in-use position with said inverted V-shaped head vertically aligned with the apex of the V-shaped cradle and said inwardly turned bottom portion of said second leg disposed beneath the opposed outwardly diverging side of the V-shaped cradle, said stem is rotated to lower said head vertically downward to engage said head on the top of a work piece supported in the cradle, thereby securely clamping the work piece to the pipe jack.

8. The articulated pipe jack clamp according to claim 7, wherein
   said inverted V-shaped head has an elastomeric coating to prevent marring of the surface of the work piece.

9. The articulated pipe jack clamp according to claim 7, wherein
   said inverted V-shaped head is connected to the bottom end of said stem by a ball-and-socket connection.

10. The articulated pipe jack clamp according to claim 1, wherein said inwardly turned bottom portion of said second leg is disposed at an angle of from about 80° to about 100° relative its said elongate upper portion.

11. An articulated pipe jack clamp for securing a work piece in a V-shaped cradle of a pipe jack, comprising:
   a central internally threaded collar member;
   an externally threaded stem threadedly engaged in said collar and having a handle at a top end and an inverted V-shaped head connected at its bottom end by a swivel connection;
   a first generally L-shaped segmented leg member having an elongate upper portion fixed at an upper end to one side of said collar to extend angularly outward and downward therefrom, and a shorter inwardly turned bottom portion segment hingedly connected at the lower end thereof adapted to be secured to the underside of one outwardly diverging side of the V-shaped cradle;
   a second generally L-shaped leg member having an elongate upper portion hingedly connected at an upper end to said threaded collar in laterally opposed relation to said first leg and a shorter inwardly turned bottom portion disposed at an angle relative to its said elongate upper portion; wherein
   when said shorter inwardly turned bottom portion segment of said first leg is secured to the underside of one outwardly diverging side of the V-shaped cradle, said clamp is pivoted over to one side of the cradle in an open position when installing or removing the pipe from the cradle, and is pivoted to an upright in-use position with said inverted V-shaped head vertically aligned with the apex of the V-shaped cradle and said inwardly turned bottom portion of said second leg disposed beneath the opposed outwardly diverging side of the V-shaped cradle, said stem is rotated to lower said head vertically downward to engage said head on the top of a work piece supported in the cradle, thereby securely clamping the work piece to the pipe jack.

12. The articulated pipe jack clamp according to claim 11, wherein
   said inverted V-shaped head has an elastomeric coating to prevent marring of the surface of the work piece.

13. The articulated pipe jack clamp according to claim 11, wherein
   said inverted V-shaped head is connected to the bottom end of said stem by a ball-and-socket connection.

14. The articulated pipe jack clamp according to claim 11, wherein
   said inwardly turned bottom portion of said second leg is disposed at an angle of from about 80° to about 100° relative its said elongate upper portion.

* * * * *